(12) United States Patent
Zavodny

(10) Patent No.: US 6,691,835 B1
(45) Date of Patent: Feb. 17, 2004

(54) DISC BRAKE

(75) Inventor: Douglas G Zavodny, Granger, IN (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/250,235

(22) Filed: Jun. 16, 2003

(51) Int. Cl.⁷ ............................................... F16D 66/02
(52) U.S. Cl. ............................ 188/1.11 W; 188/218 A
(58) Field of Search ................................... 188/1.11 W

(56) References Cited

U.S. PATENT DOCUMENTS

| | | | | |
|---|---|---|---|---|
| 3,918,553 A | * | 11/1975 | Hattwig et al. | 188/1.11 R |
| 3,958,666 A | * | 5/1976 | Hooten et al. | 188/1.11 R |
| 4,049,084 A | * | 9/1977 | Beemer et al. | 188/1.11 R |
| 4,085,824 A | * | 4/1978 | Nomura | 188/1.11 W |
| 4,085,827 A | * | 4/1978 | Kestermeier | 188/1.11 W |
| 4,174,024 A | * | 11/1979 | Hagiwara | 188/1.11 W |
| 4,234,058 A | * | 11/1980 | Yamamoto | 188/1.11 W |
| 5,069,314 A | * | 12/1991 | Madzgalla et al. | 188/73.36 |
| 5,339,928 A | * | 8/1994 | Deit et al. | 188/1.11 W |
| 5,388,670 A | * | 2/1995 | Kuskye et al. | 188/73.38 |

* cited by examiner

Primary Examiner—Matthew C. Graham
Assistant Examiner—Benjamin A. Pezzlo
(74) Attorney, Agent, or Firm—Leo H McCormick, Jr.; Warren Comstock

(57) ABSTRACT

A disc brake assembly has a support member secured to a vehicle to position a caliper over a rotor. The caliper has a housing with a bore therein for retaining a piston and a first friction member attached thereto in alignment with a first braking surface on the rotor and a bridge that straddles the rotor to position a second friction member in alignment with a second braking surface on the rotor. The bore receives pressurized fluid from a source that acts on the piston to develop an actuation force for moving the first friction member into engagement with the first braking surface and acts on the housing to cause the caliper to move the second friction member into engagement with the second braking surface to effect a brake application. The first and second friction members have a first initial thickness and the rotor has a second initial thickness that are reduced with each brake application. An arm of a clip of an indicator arrangement secured to one of the first and second friction members engages the rotor to inform an operator when an instant thickness of the first and second friction member and rotor is equated to a predetermined thickness. The indicator arrangement is characterized by the arm engaging a plurality of projections that extend from the rotor at a location adjacent one of the first and second braking surfaces when the predetermined instant thickness occurs to create a clicking noise that distinctly identifies to an operator optimum braking of the vehicle may not be achieved with the present first and second friction member and rotor.

3 Claims, 3 Drawing Sheets

DISC BRAKE

BACKGROUND OF INVENTION

Disc brakes have first and second friction members aligned by a caliper on opposite sides of a rotor that is attached to an axle retained in a bearing held in a housing of a vehicle. The friction members are urged into frictional engagement with the rotor to effect a brake application of a vehicle. The frictional engagement causes the first and second friction members to wear and after a period of time are worn such that it is necessary to replace the first and second friction members. Wear of the friction members is usually communicated to an operator through a wear indicator of which the indicators disclosed in U.S. Pat. Nos. 4,745,992; 4,067,418; 4,460,067 may be considered as being typical. In such wear indicators, an arm member that is connected to a backing plate for a friction member and during a brake application contacts the braking surface on the rotor to create a squeal sound or noise. Unfortunately, the squeal sound often is unsatisfactory as the sound is too soft or similar to other sounds created during engagement of a brake pad with the rotor and as a result a delay occurs in the communication of this information to an operator. Further, once the arm member engages the rotor it is possible to scratch and mar the rotor braking surface in such a manner that unnecessary re-facing must be performed before replacement with new first and second friction members occurs.

SUMMARY OF INVENTION

A primary object of the present invention is to provide a disc brake with indicator means that produce a distinctive clicking sound when a predetermined wear of the friction members occurs so that an operator will instinctively associate the clicking sound with a need to replace the friction members in the disc brake.

According to this invention, the disc brake assembly has a support member that is secured to a vehicle. A caliper retained in the support member has an actuation section that is connected by a bridge to an arm. The actuation section has an actuation bore therein for retaining a piston to define an actuation chamber. A first friction member is connected to the piston and aligned with a first braking surface on a rotor associated with a wheel on the vehicle. A second friction member is connected to the arm and aligned with a second braking surface on the rotor. The actuation chamber on being presented pressurized fluid from a source acts on the piston to develop an actuation force that moves the piston and first friction member toward and into engagement with the first braking surface and acts on the actuation section such that the caliper moves the second friction member into engagement with the second braking surface to effect a brake application. The first and second friction members have a first initial thickness and the rotor has a second initial thickness. With each brake application the first and second initial thickness change as the first and second friction members and said rotor are worn away to define an instant thickness. An indicator arrangement includes a clip member that is secured to one or both of the first and second friction members having an arm that engages the rotor to inform an operator when an instant thickness is equated to a predetermined thickness corresponding to a thickness where the first and second friction member need to be replaced. The indicator arrangement is characterized in that the rotor includes a plurality of projections that extend from the rotor at a location adjacent to one of the first and second braking surfaces. When the predetermined instant thickness occurs the arm engages the plurality of projections to create a clicking noise that distinctly identifies to an operator optimum braking of the vehicle may not be achieved with the present first and second friction member and rotor.

An advantage of the disc brake of this invention resides in projections that extend from a rotor for an arm of a clip member to engage and create a distinct sound to inform an operator of a wear condition of friction members.

A further advantage of this disc brake resides in the coating of a sound generation arrangement to protect the components from corrosion at least until engagement occurs after a predetermined wear of the friction members.

DETAILED DESCRIPTION

Figure 1:
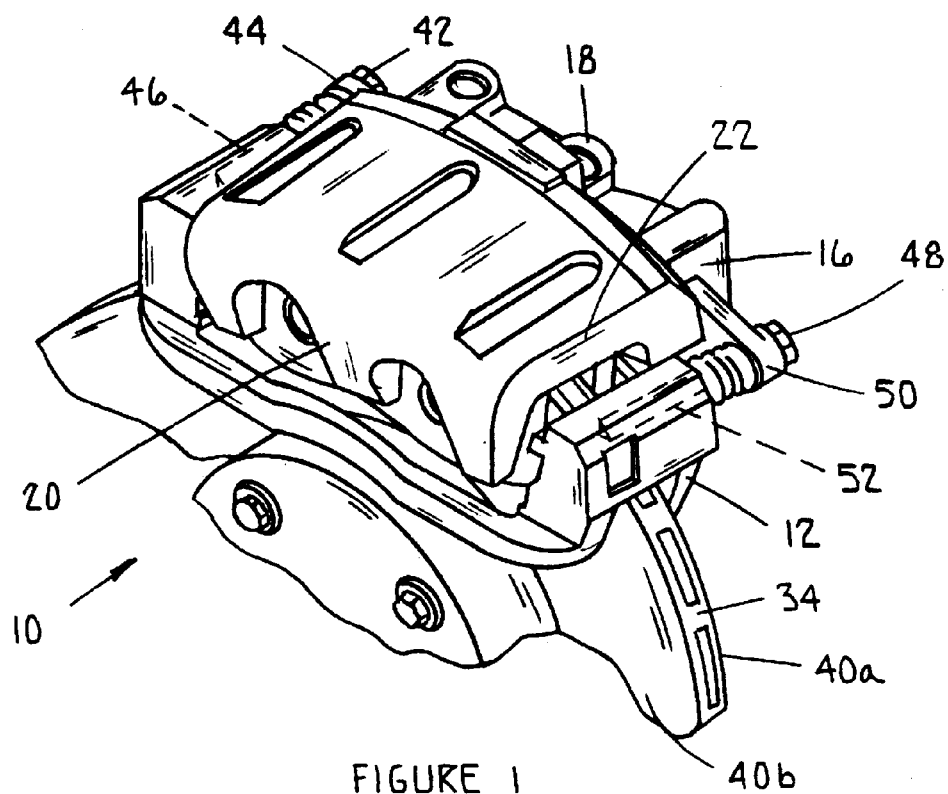
FIG. 1 is a perspective view of a disc brake having been made according to the principals of the present invention.

The disc brake 10 shown in FIG. 1 is of a type known in the prior art for use in a brake system of a vehicle such as disclosed in U.S. Pat. No. 5,810,122 that has been modified according to the present invention.

Disc brake 10 includes an anchor or support member 12 that is fixed to a housing on a vehicle, an integral caliper 16 that includes an actuation section 18 that is connected by a bridge 22 to an arm 20 and a rotor 34. The actuation section 18 has a bore 24 therein for retention of a piston 26 to define an actuation chamber 28. A first brake pad member 30 is connected to piston 26 while a brake pad member 38 is connected to arm 20. The first 30 and second 38 brake pad members are respectively located adjacent to a first braking face 40a and a second braking face 40b of a rotor 34 which is connected to rotate with an axle of the vehicle. A first guide pin 42 is connected to an ear 44 that extends from the actuation section 18 and is mounted to slide in a first bore 46 in the support member 12. A second guide pin 48 is connected to an ear 50 that extends from the actuation section 18 and is mounted to slide in a second bore 52 in the support member 12. The first 46 and second 52 bores are spaced apart, parallel, and designed to respectively hold the first guide pin 42 and the second guide pin 48 in a perpendicular relationship with respect to the rotor 34 such that the first brake pad member 30 is held in a first plane that is parallel with the first braking surface 40a and the second brake pad member 38 is held in a second plane that is parallel with second braking face 40b on rotor 34. When an operator desires to effect a brake application, pressurized fluid is supplied to the actuation chamber 28. The pressurized fluid presented to the actuation chamber 28 acts on a piston 26 to move the first brake pad member 30 and the friction material 32 thereon into frictional engagement with the first braking surface 40a and acts on caliper 16 to move the second brake pad member 38 and the friction material 39 thereon into frictional engagement with the second braking surface 40*b* to develop a brake force to reduce the rotation of rotor 34. The disc brake 10 functions in this manner until a predetermined wear occurs in the first 32 and second 39 friction materials and/or rotor 34. When this predetermined wear occurs, an indicator arrangement 100 functions to informs an operator, through a distinct clicking sound, that it is intuitively necessary to replace the first and second friction materials 32 and 39 and/or refurbish the rotor 34 to maintain optimum braking of the vehicle.

Figure 4:
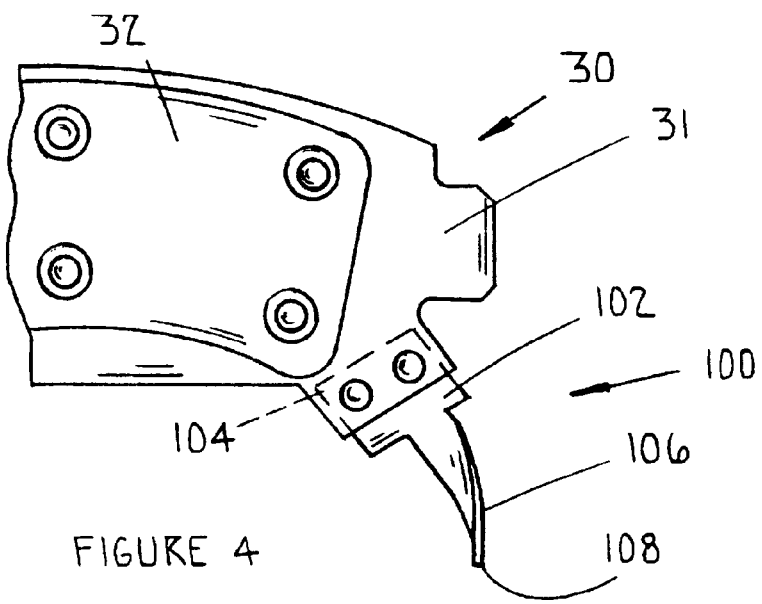
FIG. 4 is a view taken of a friction member for use in the disc brake of FIG. 1.

The indicator arrangement 100 of the present invention includes a metal clip 102 that is fixed to a backing plate 31 for brake pad member 30, see FIG. 4 and includes a base 104 that is attached to the backing plate 31 of the first brake pad member 30 and an arm 106 that extends therefrom. Arm 106 has an end 108 that extends on an arcuate position outside of the face 40*a* on rotor 34 and never contacts the braking surface. Arm 106 has a general rectangular shape with a 90° spiral from base 104 to end 108 such that the larger dimension of arm 106 is perpendicular to the base 104 and as a result end 108 may flex with respect to the base 104 as a function of the coefficient of stiffness of clip 102.

Figure 2:
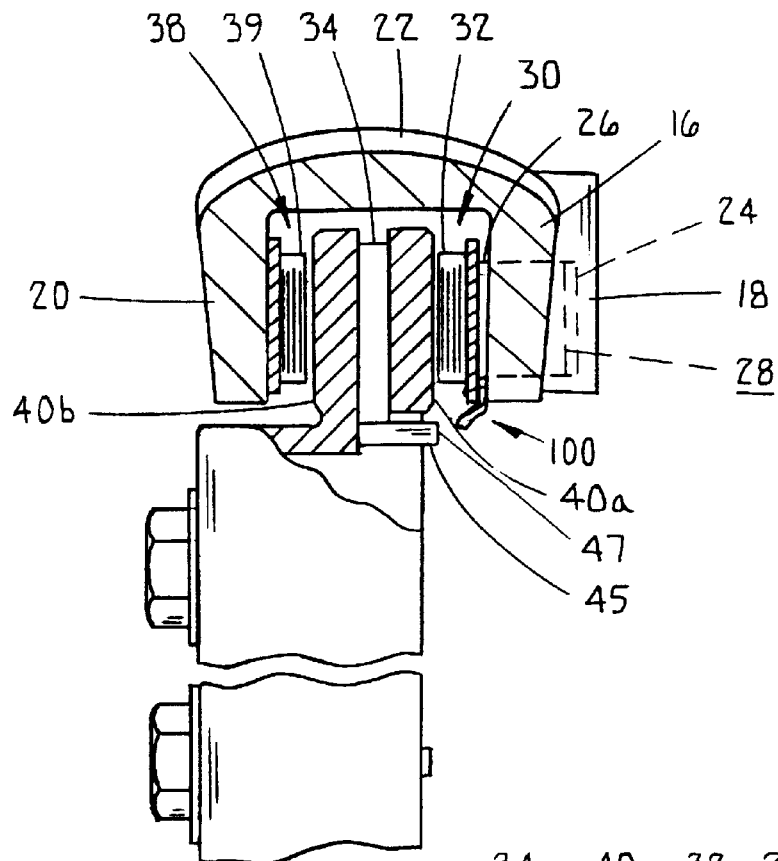
FIG. 2 is a side of the disc brake of FIG. 1 showing a sectional view taken along lines 2—2.
Figure 3:
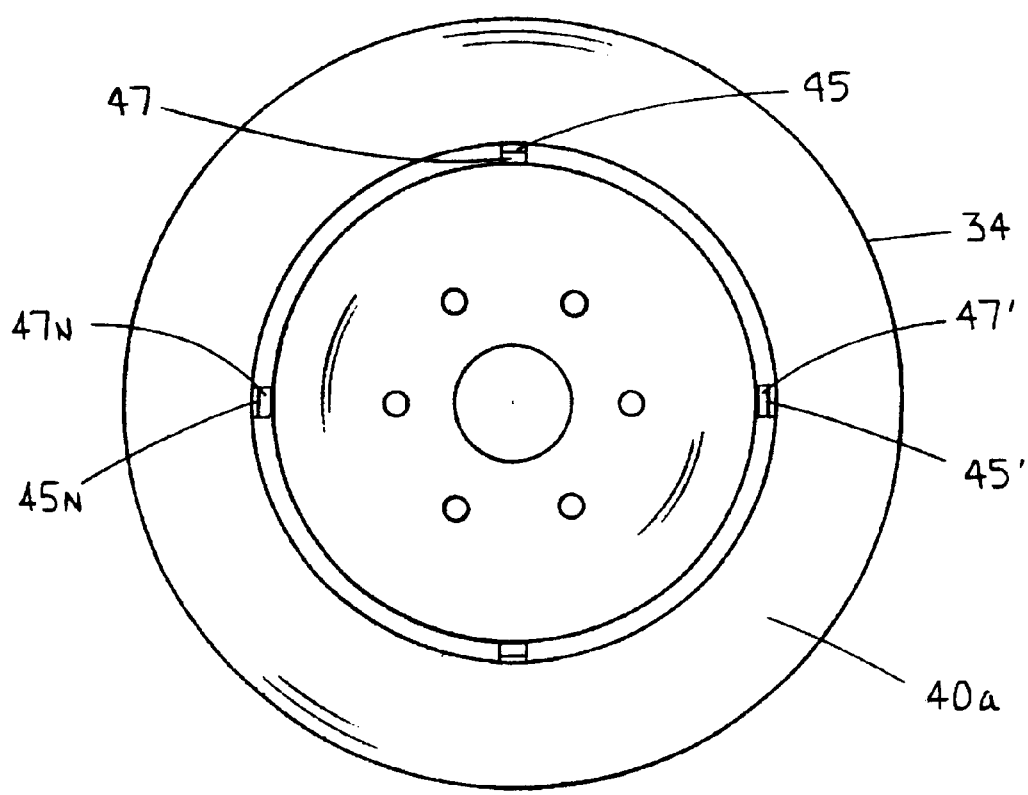
FIG. 3 is a rear view of a rotor for use in the disc brake of FIG. 1.

The engagement of end 108 of metal clip 102 with rotor 34 will only occur outside of the braking surface 40*a* in an area defined by a plurality of projections 45,45' - - - 45$^n$ see FIG. 2, as the end 108 extends from the backing plate 31 to a location adjacent to the first surface 40*a*. The plurality of projections 45,45' - - - 45$^n$ as shown as being equally spaced in an arc about the axis of rotor 34, see FIG. 3 but could be spaced differently as long as a balance of the rotor 34 about its axis is not effect. The plurality of projections 45,45' - - - 45$^n$ have a corresponding height or apex 47,47' - - - 47$^n$ that extends above the braking surface 40*a* and is a function of and equal to an initial thickness of the friction material 32 for the first brake pad member 30. In order to protect the arm 106 and the plurality of projections 45,45' - - - 45$^{na}$ coated is applied to at least this portion of the first brake pad member 30 to inhibit corrosion.

Figure 5:
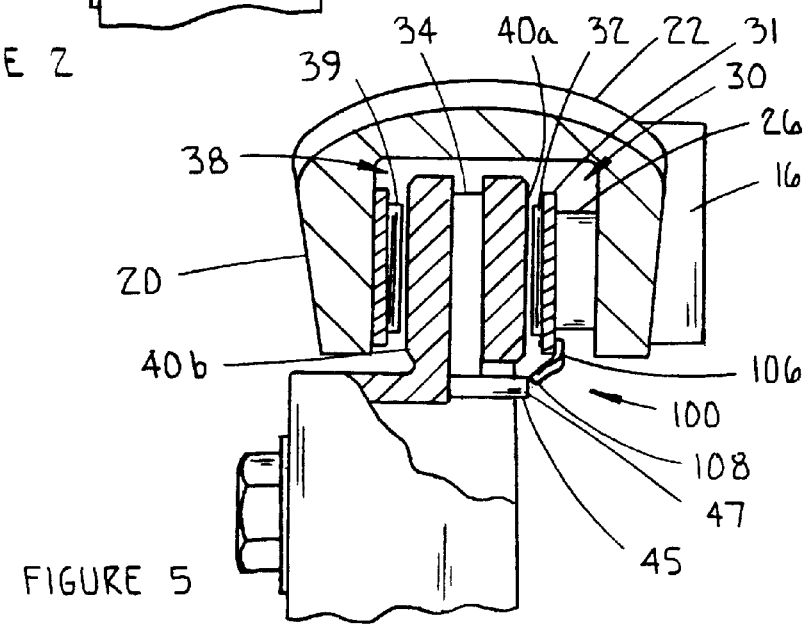
FIG. 5 is a sectional view showing a relationship between a friction member and the rotor of FIG. 1 after the friction member has worn to a predetermined instant thickness.

The relationship between the end 108 of arm 106 and the plurality of projections 45,45' - - - 45$^n$ is best illustrated in FIGS. 2 and 5. FIG. 2 illustrates an initial thickness of friction material 32 and FIG. 5 illustrates a relationship when the first 32 and/or second 39 friction materials is worn through engagement with rotor 34 to an instant thickness wherein end 108 contacts the height or apex 47,47' - - - 47$^n$ of the plurality of projections 45,45' - - - 45$^n$ to create a clicking noise whenever the first brake pad member 30 is moved to effect a brake application. The clicking noise creates a sound that distinctly identifies to an operator, optimum braking of the vehicle may not be achieved with the present first 30 and second 38 brake pad members. This distinct sound could be enhanced by having a number of the plurality of projections 45,45' - - - 45$^n$ having a first height corresponding to a function of the initial thickness of the friction material 32 and a second number of the plurality of projections 45,45' - - - 45$^n$ have a second height such that the initial clicking noise would have a first sound and as the friction material 32 continues to be worn without replacement change to a more intense clicking sound.

When the first 30 and second 38 brake pad members are replaced and it is not necessary to reface the first braking surface 40*a* and second braking surface 40*b*, it would be necessary to reface the apex 47,47' - - - 47$^n$ of the plurality of projections 45,45' - - - 45$^n$ by reducing the height thereof an amount equal an initial thickness of the rotor 34 less the current thickness of the worn rotor 34 to maintain a same space relationship between the end 108 of arm 106 and the plurality of projections 45,45' - - - 45$^n$. In any event, the corrosion protected arm 106 and plurality of projections 45,45' - - - 45$^n$ remain constant for the entire life of the first 30 and second 38 brake pad members and as a result the distinct clicking sound produced when they do become engaged to inform an operator of the thickness of the friction material 32.

I claim:

1. A disc brake assembly having a support member secured to a vehicle, a caliper having an actuation section that is connected by a bridge to an arm, said actuation section having an actuation bore therein for retaining a piston to define an actuation chamber with a first friction member connected to said piston and aligned with a first braking surface on a rotor associated with a wheel on the vehicle and a second friction member connected to said arm and aligned with a second braking surface on said rotor, said actuation chamber on being presented pressurized fluid from a source acting on said piston to develop an actuation force to move said piston and first friction member into engagement with said first braking surface and acting on said actuation section causing said caliper to move said second friction member into engagement with said second braking surface to effect a brake application, said first and second friction members having a first initial thickness and said rotor having a second initial thickness and with each brake application said first and second initial thickness changes as said first and second friction members and said rotor are worn to define a new instant thickness, indicator means secured to one of said first and second friction members that engages said rotor to inform an operator when said new instant thickness is equated to a predetermined thickness, said indicator means being characterized by a clip member that is attached to one of said friction member with an arm that extends therefrom such that said arm does not engages a braking surface on said rotor; and a plurality of equally spaced projections that extend in an arc about the axis of said rotor a location adjacent to one of said first and second braking surfaces and do not effect the balance for said rotor, said arm engaging said plurality of projections when said new instant thickness is equal to said predetermined thickness to create a clicking noise that distinctly identifies to an operator optimum braking of the vehicle may not be achieved with the present first and second friction member and rotor, said clicking noise being initially created through the engagement of said arm with a first number of said plurality of projections having a first apex that corresponds to said predetermined thickness and later with a second number of said plurality of projections having a second apex height such a pitch of said clicking noise changes as function of a new instant thickness of said friction members further decreases from said predetermined thickness.

2. The disc brake as recited in claim 1 wherein a height of said first apex is reduced by an amount corresponding to a change in an initial thickness of said rotor with a replacement of said first and second friction members to maintain a substantially constant predetermined thickness for the creation of said clicking noise.

3. The disc brake assembly as recited in claim 1 wherein said plurality of projections and said arm are protected from corrosion by a coating such that even after an extended period of time the distinctness of the clicking noise is not effected by environmental conditions.

* * * * *